US012087016B2

United States Patent
Cowley et al.

(10) Patent No.: US 12,087,016 B2
(45) Date of Patent: Sep. 10, 2024

(54) CIRCUITRY AND METHODS FOR MITIGATING IMBALANCE IN IMAGE SENSORS WITH MULTIPLE READOUT PATHS

(71) Applicant: SEMICONDUCTOR COMPONENTS INDUSTRIES, LLC, Phoenix, AZ (US)

(72) Inventors: Nicholas Paul Cowley, Wroughton (GB); Mukesh Rao Engla Syam, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 115 days.

(21) Appl. No.: 18/057,408

(22) Filed: Nov. 21, 2022

(65) Prior Publication Data

US 2024/0169586 A1   May 23, 2024

(51) Int. Cl.
  *G06T 7/80*   (2017.01)
  *H04N 25/633*   (2023.01)
  *H04N 25/78*   (2023.01)

(52) U.S. Cl.
  CPC ............. *G06T 7/80* (2017.01); *H04N 25/633* (2023.01); *H04N 25/78* (2023.01)

(58) Field of Classification Search
  CPC ......... G06T 7/80; H04N 25/633; H04N 25/78
  See application file for complete search history.

(56) References Cited

U.S. PATENT DOCUMENTS

| 2007/0236275 A1 | 10/2007 | Smeloy et al. | |
| 2008/0258042 A1* | 10/2008 | Krymski | H04N 25/46 348/E3.018 |
| 2010/0110254 A1* | 5/2010 | Mo | H04N 25/75 348/308 |

(Continued)

OTHER PUBLICATIONS

Masanori Furuta et al., "A High-Speed, High-Sensitivity Digital CMOS Image Sensor With a Global Shutter and 12-bit Column-Parallel Cyclic A/D Converters," IEEE Journal of Solid-State Circuits, vol. 42, No. 4, Apr. 2007.

(Continued)

*Primary Examiner* — Shahbaz Nazrul
(74) *Attorney, Agent, or Firm* — Treyz Law Group, P.C.; Jason Tsai

(57) ABSTRACT

An image sensor may include a pixel array and associated readout paths calibration circuitry. The image sensor may include first column readout circuits formed along a first edge of the pixel array and second column readout circuits formed along a second opposing edge of the pixel array. The readout paths calibration circuitry may include one or more first calibration readout circuits located by the first edge of the array, one or more second calibration readout circuits located by the second edge of the array, and an error detection circuit configured to output an error signal based on signals output from the one or more first calibration readout circuits and the one or more second calibration readout circuits. The one or more second calibration readout circuits and the second column readout circuits can receive a reference voltage that is dynamically adjusted based on the error signal.

20 Claims, 9 Drawing Sheets

(56) References Cited

U.S. PATENT DOCUMENTS

| | | | |
|---|---|---|---|
| 2015/0049231 A1* | 2/2015 | Chen | H04N 25/75 348/308 |
| 2016/0203777 A1 | 7/2016 | Brahma et al. | |
| 2018/0234656 A1* | 8/2018 | Krymski | H04N 25/767 |
| 2023/0370752 A1* | 11/2023 | Lee | G06V 40/172 |

OTHER PUBLICATIONS

C. Pastorelli et al., "ADC Techniques for Optimized Conversion Time in CMOS Image Sensor," Society for Science and Technology, 2016.

M. ansh Raaja et al., "Calibrating Amplifiers and ADCs in SoCs," study viewer, Feb. 6, 2012.

* cited by examiner

CIRCUITRY AND METHODS FOR MITIGATING IMBALANCE IN IMAGE SENSORS WITH MULTIPLE READOUT PATHS

BACKGROUND

This relates generally to imaging systems and more specifically to image sensors with large pixel arrays.

An image sensor can include a large pixel array with thousands of rows and thousands of columns. The image sensor can include row control circuitry for providing row control signals to different rows of pixels in the array via corresponding row control lines. The image sensor can also include column readout circuitry for reading out signals from the pixel array. It can be challenging to design an image sensor with large pixel arrays.

When the pixel array is very large, the column readout circuitry is sometimes divided into multiple column readout subcircuits. For instance, a large pixel array can be divided into a top half portion that is read out using a first column readout subcircuit via a first read path and a bottom half portion that is read out using a second column readout subcircuit via a second read path. The first column readout subcircuit includes first analog-to-digital converters for performing data conversion for the first read path, whereas the second column readout subcircuit includes second analog-to-digital converters for performing data conversion for the second read path.

It can be difficult to supply a matching reference voltage to both the first and second read paths. If care is not taken, any offset in the voltage references that are provided to the first and second column readout subcircuits can lead to undesired image artifacts. It is within this context that the embodiments herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels, sometimes referred to as image sensor pixels or imaging pixels. The image sensor pixels include photosensitive elements such as photodiodes that convert the incoming light into image signals. Image sensors may include hundreds, thousands, or millions of imaging pixels. Image sensors may include control circuitry such as driver circuitry for selectively accessing the pixels and readout circuitry for reading out image signals corresponding to the electric charge generated by the photosensitive elements.

Figure 1:
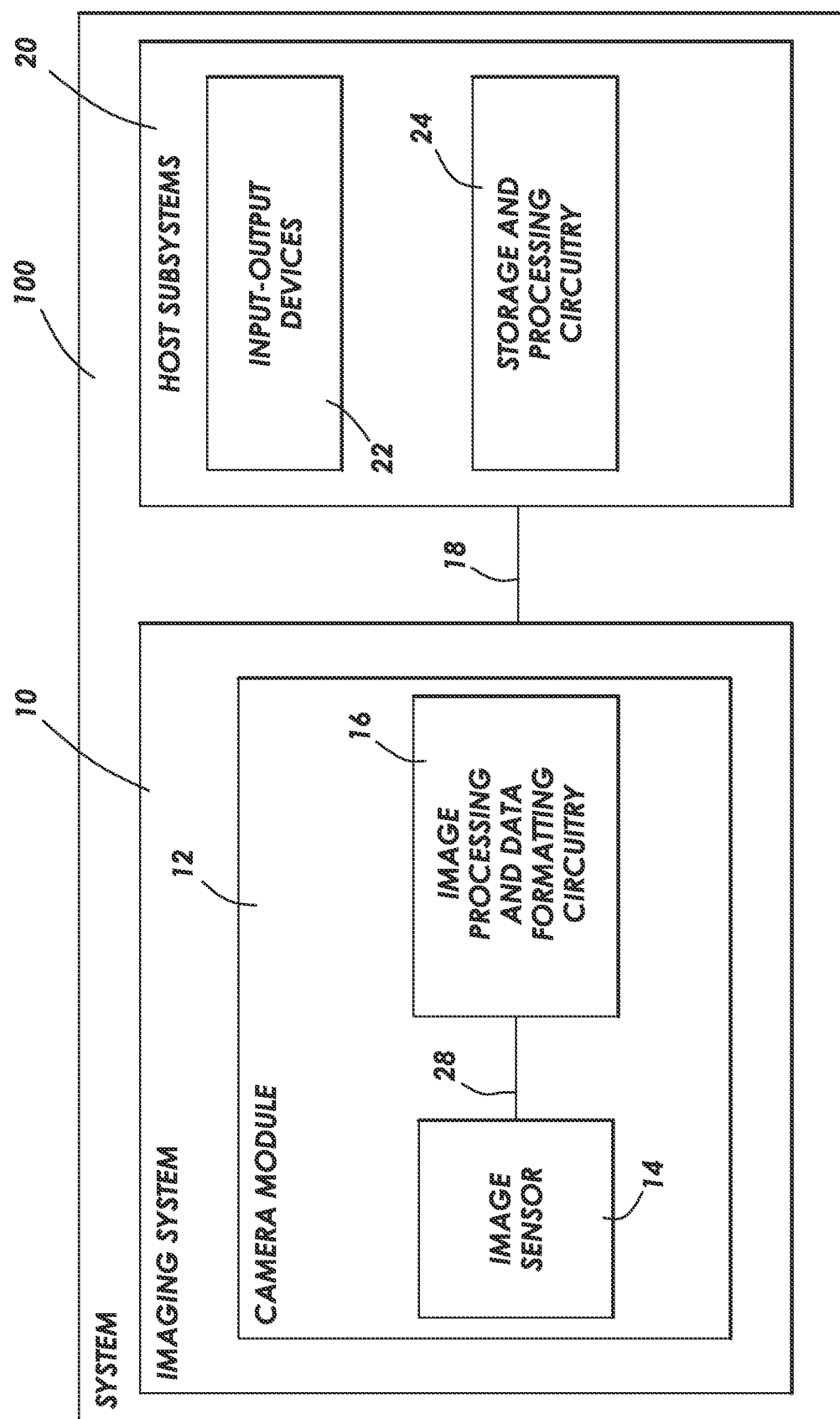
FIG. 1 is a diagram of an illustrative system having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include a camera such as camera module 12. Camera module 12 may include one or more image sensors 14, such as in an image sensor array integrated circuit, and one or more lenses. Image sensor 14 is sometimes referred to as an optical sensor. Image sensor 14 may be formed on one or more integrated circuit (IC) chips. During image capture operations, each lens may focus light onto an associated image sensor 14. Image sensor 14 may include photosensitive elements such as image sensor pixels that convert incoming light into digital data. Image sensor 14 may include hundreds of pixels, thousands of pixels, millions of pixels, or any desired number of pixels.

Each image sensor in camera module 12 may be identical or there may be different types of image sensors in a given image sensor array integrated circuit. In some examples, image sensor 14 may further include bias circuitry, sample and hold circuitry, correlated double sampling (CDS) circuitry, amplifier circuitry, analog-to-digital converter circuitry, data output circuitry, memory, buffer circuitry, and/or addressing circuitry.

Still and video image data from image sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that are stacked vertically with respect to each other.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
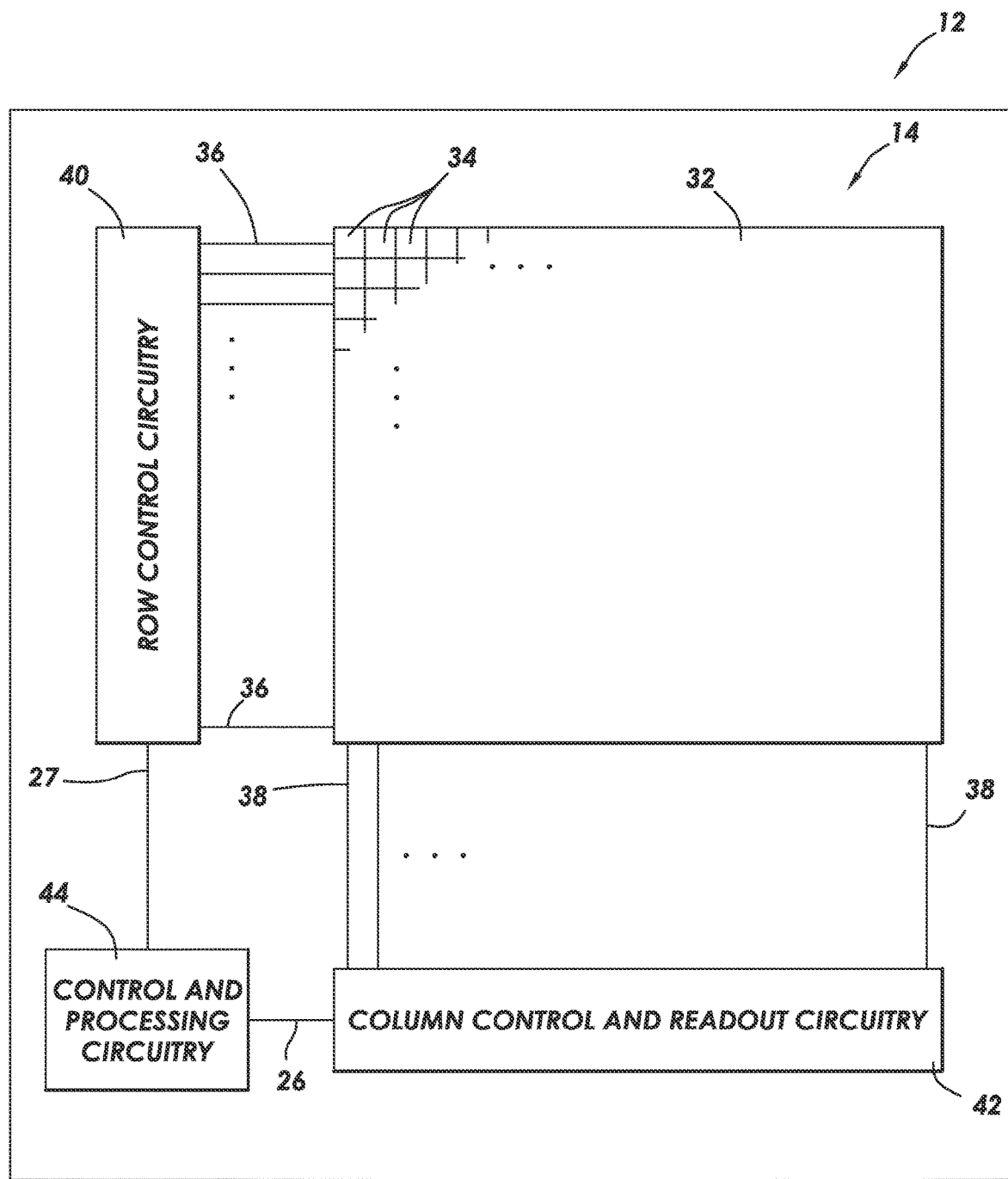
FIG. 2 is a diagram of an illustrative pixel array and associated row and column control circuitry for reading out signals from the pixel array in accordance with some embodiments.

An example of an arrangement of image sensor 14 of FIG. 1 is shown in FIG. 2. As shown in FIG. 2, image sensor 14 may include control and processing circuitry 44. Control and processing circuitry 44, sometimes referred to as control and processing logic, may be part of image processing and data formatting circuitry 16 in FIG. 1 or may be separate from circuitry 16. Image sensor 14 may include a pixel array such as array 32 of pixels 34. Pixels 34 are sometimes referred to herein as image sensor pixels, imaging pixels, or image pixels. Control and processing circuitry 44 may be coupled to row control circuitry 40 via control path 27 and may be coupled to column control and readout circuitry 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38.

For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and/or column memory for storing the readout signals and any other desired data. Column control and readout circuitry 42 may output digital pixel readout values to control and processing logic 44 over line 26.

Pixel array 32 may have any number of rows and columns. In general, the size of image pixel array 32 and the number of rows and columns in array 32 will depend on the particular implementation of image sensor 14. While "rows" and "columns" are generally described herein as being horizontal and vertical, respectively, the terms rows and columns may be used interchangeably and can refer to any grid-like structure. Features described herein as "rows" may be arranged vertically and features described herein as "columns" may be arranged horizontally.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern as an example. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements, yellow color filter elements, etc.) may be used instead of green pixels in a Bayer pattern. These examples are merely illustrative and, in general, color filter elements of any desired color and in any desired pattern may be formed over any desired number of image pixels 34.

Figure 3:
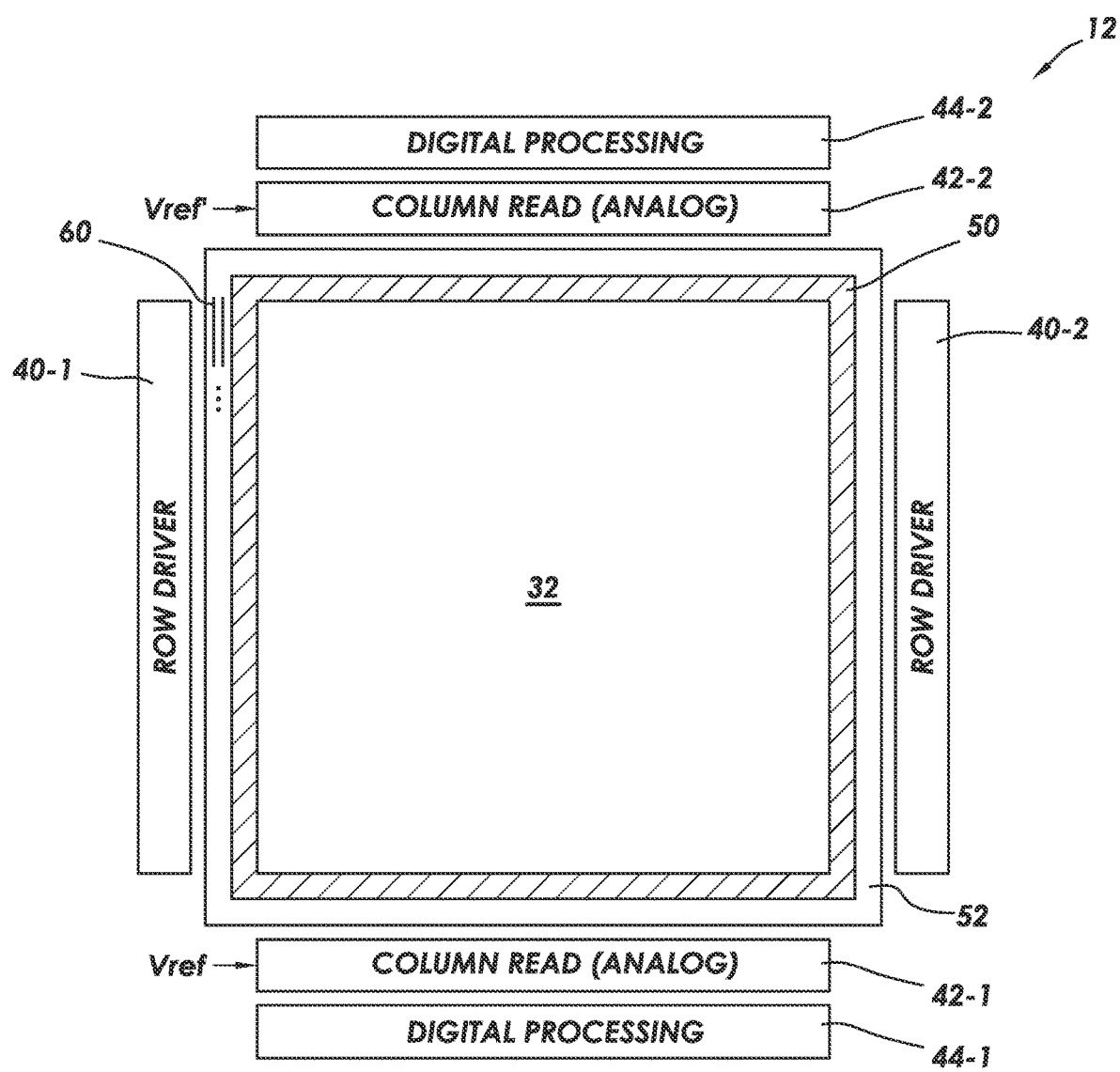
FIG. 3 is a top (plan) view of an illustrative image sensor having column readout circuits formed along different sides of an imaging array in accordance with some embodiments.

An image sensor can sometimes include very large pixel arrays. For example, a large pixel array can include thousands of columns and/or thousands of rows. As described above in connection with FIG. 2, pixel array 32 can be controlled using row control circuitry 40 and can be read out using column control and readout circuitry 42. When pixel array 32 is very large, row control circuitry 40 and column control and readout circuitry 42 are sometimes divided up and formed on opposing sides of array 32. In some embodiments, row control circuitry 40 can be divided into multiple portions all disposed on one side of array 32. FIG. 3 is a top (layout) view of imaging device 12 in which the row and column control circuitries are divided into multiple portions formed on different sides of array 32.

As shown in FIG. 3, first row driver circuits 40-1 can be formed on a first (left) edge of pixel array 32, whereas second row driver circuits 40-2 can be formed on a second (right) edge of pixel array 32. As an example, first row driver circuits 40-1 may be configured to generate row control signals for a left half of pixel array 32, whereas second row driver circuits 40-2 may be configured to generate row control signals for a right half of pixel array 32. As another example, the first row driver circuits 40-1 may be configured to generate row control signals for odd rows in pixel array 32, whereas second row driver circuits 40-2 may be configured to generate row control signals for even rows in pixel array 32, or vice versa. This is merely illustrative. Other ways of providing row control signals to different portions of pixel array 32 can be employed.

First column readout circuits 42-1 can be formed on a third (lower) edge of pixel array 32, whereas second column readout circuits 42-2 can be formed on a fourth (upper) edge of pixel array 32. As an example, first column readout circuits 42-1 may be configured to read out signals from a lower (bottom) half of pixel array 32, whereas second column readout circuits 42-2 may be configured to read out signals from an upper (top) half of pixel array 32. As another example, first column readout circuits 42-1 may be configured to read out signals from odd columns in pixel array 32, whereas second column readout circuits 42-2 may be configured to read out signals from even columns in pixel array 32, or vice versa. This is merely illustrative. Other ways of reading signals out from different portions of pixel array 32 can be employed. For example, pixel array 32 can be subdivided into different tiles or quadrants, and the different regions can be read out via one or more read paths independently or at different frame rates.

Column readout circuits 42-1 and 42-2 are coupled to the imaging pixels in array 32 via column lines 38 (see FIG. 2) and can include a data converter such as an analog-to-digital converter (ADC), an optional column amplifier, and a memory circuit that are coupled to each respective column line 38. Column readout circuits 42-1 and 42-2 can be referred to and considered as analog readout circuits for outputting digital signals. The digital signals output from column readout circuits 42-1 and 42-2 can be fed to one or more digital processing circuits. In the example of FIG. 3, a first digital processing circuit 44-1 can receive digital signals from column readout circuits 42-1, whereas a second digital processing circuit 44-2 can receive digital signals from column readout circuits 42-2. Digital processing circuits 44-1 and 44-2 can be considered part of control and processing circuitry 44 (see FIG. 2) and can be formed as part of the same integrated circuit chip as imaging pixel 32 or on a separate integrated circuit chip in a stacked image sensor arrangement (as an example).

Figure 4:
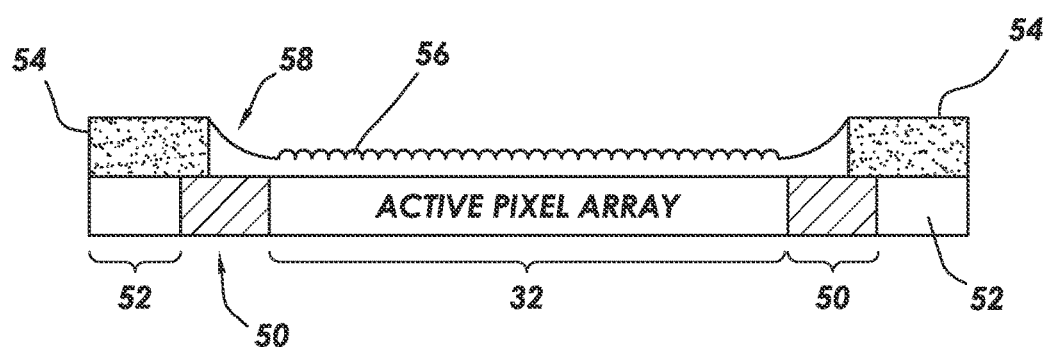
FIG. 4 is a cross-sectional side view of an image sensor showing an active imaging array surrounded by a keep out region and a reference path region in accordance with some embodiments.

Pixel array 32 may include imaging pixels formed in an active imaging portion of the image sensor. Pixel array 32 may optionally be surrounded by a keep out region (zone) 50. The keep out region 50 may be surrounded by a reference path region 52. Reference path region 52 may include reference lines such as reference column lines 60. FIG. 4 is a cross-sectional side view of an illustrative image sensor showing an active imaging array 32 surrounded by keep out region 50 and a reference path region 52. As shown in FIG. 4, a microlens array such as microlens array 56 may be formed over active pixel array 32. Microlens array 56 may have an edge portion 58 that is dish shaped or exhibiting other curved shape (as an example). The curved shape edge portion 58 of the microlens array may not be conducive to focusing light in the desired manner and may thus be positioned over the keep out zone 50. A light shielding layer such as light shielding (blocking) layer 54 may be formed over reference path region 52. As described above, one or more reference column lines, reference row lines, or other reference control lines can be formed within reference path region 52.

Referring back to FIG. 3, the column readout circuits 42-1 formed on one side of pixel array 32 are said to read out signals from a first portion of array 32 via a first readout path, whereas the column readout circuits 42-2 formed on another side of pixel array 32 are said to read out signals from a second portion of array 32 via a second readout path. As described above, column readout circuits 42-1 and 42-2 can include analog-to-digital converters, adjustable-gain amplifiers, and/or other column readout circuits that require an accurate reference voltage. Due to the difference in physical location of the column readout circuits 42-1 and 42-2, the reference voltage(s) provided to the ADCs in column readout circuits 42-1 and to the ADCs in column readout circuits 42-2 can be slightly offset from one another. Inadvertent offset in the reference voltages for column readout circuits 42-1 and 42-2 can lead to systematic offsets between the first and second readout paths, which can result in undesired image artifacts between the two portions of array 32.

Figure 5:
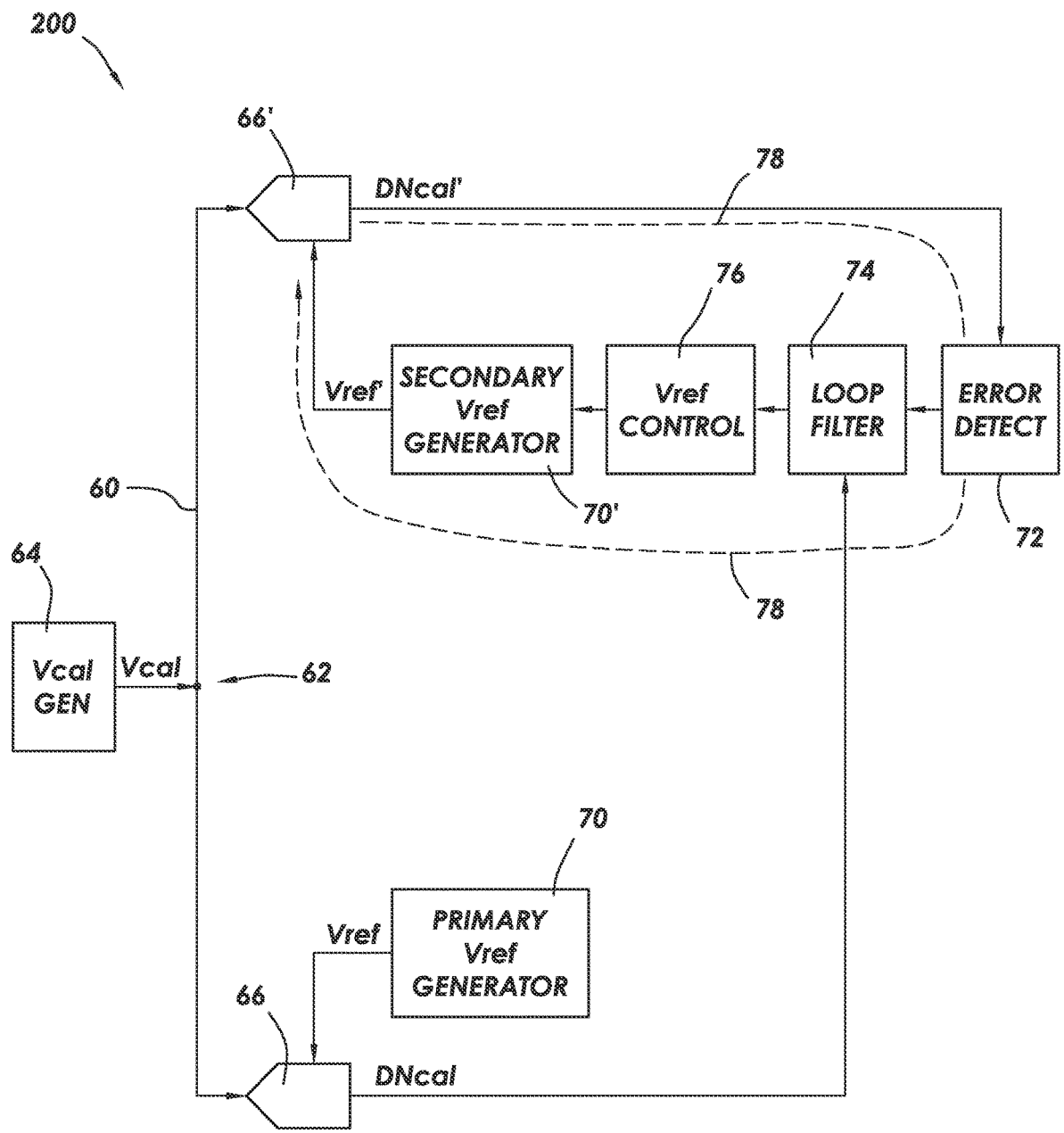
FIG. 5 is a block diagram of illustrative readout paths calibration circuitry that uses one or more calibration column paths in accordance with some embodiments.

In accordance with an embodiment, FIG. 5 shows calibration circuitry such as calibration circuitry 200 that can be provided on an imaging device, such as the imaging device shown in FIGS. 1-4, and that can be configured to mitigate imbalance between two or more readout paths in the imaging device. Calibration circuitry 200 is therefore sometimes referred to as readout paths calibration circuitry 200. As shown in FIG. 5, readout paths calibration circuitry 200 may include a calibration voltage generation circuit such as calibration voltage generator 64, a first column readout circuit 66, a primary reference voltage generator 70, a second column readout circuit 66', a secondary reference voltage generator 70', an error detection circuit 72, a loop filter 74, and a reference control circuit 76.

Calibration voltage generator 64 may be disposed at a center point or midpoint 62 along reference column line 60 that is formed in reference path region 52 (see FIGS. 3 and 4). Calibration voltage generator 64 can be configured to generate a calibration voltage Vcal that is injected into center point 62. The calibration voltage Vcal will then propagate down to first column readout circuit 66 along the lower half segment of reference column line 60 and up to second column readout circuit 66' along the upper half segment of reference column line 60. Since Vcal is injected at the center point 62 of reference column line 60, any losses due to track impedance (for example) are balanced for the two readout paths.

First column readout circuit 66 may be disposed near or by the column readout circuits 42-1 at the bottom peripheral edge of the pixel array. First column readout circuit 66 can include an analog-to-digital converter and an optional column amplifier. First column readout circuit 66 can receive calibration voltage Vcal output from calibration voltage generator 64. First column readout circuit 66 can represent a dedicated column readout circuit (sometimes referred to as a calibration readout circuit) for the reference column lines in region 52 or can be one of the active column readout circuits 42-1. In the latter scenario, an input multiplexing switch can be used to switch between reading signals out from reference column line 60 and a pixel output column line 38. First column readout circuit 66 can receive a reference voltage Vref from primary reference voltage generator 70 and can generate a corresponding first calibration output DNcal. Primary reference voltage generator 70 may be disposed near or right next to first column readout circuit 66. Calibration output DNcal may be a first digital number that is a function of the received Vcal and Vref voltages. If desired, temporal averaging of DNcal can be applied to help mitigate noise degradation and to average any second order mismatches in the two regions of single path 60. First column readout circuit 66 is sometimes referred to as a primary column readout circuit or a master column readout circuit. Primary reference voltage generator 70 is sometimes referred to as a master reference voltage generator.

Second column readout circuit 66' may be disposed near or by the column readout circuits 42-2 at the top peripheral edge of the pixel array. Second column readout circuit 66' can include an analog-to-digital converter and an optional column amplifier. Second column readout circuit 66' can also receive calibration voltage Vcal output from calibration voltage generator 64 via reference column line 60. Second column readout circuit 66' can represent a dedicated column readout circuit (sometimes referred to as a calibration readout circuit) for the reference column lines in region 52 or can be one of the active column readout circuits 42-2. In the latter scenario, an input multiplexing switch can be used to switch between reading signals out from reference column line 60 and a pixel output column line 38. Second column readout circuit 66' can receive a reference voltage Vref' from secondary reference voltage generator 70' and can generate a corresponding second calibration output DNcal'. Secondary reference voltage generator 70' may be disposed near or right next to second column readout circuit 66'. Calibration output DNcal' may be a second digital number that is a function of the received Vcal and Vref' voltages. If desired, temporal averaging of DNcal' can be applied to help mitigate noise degradation and to average any second order mismatches in the two regions of single path 60. Second column readout circuit 66' is sometimes referred to as a secondary column readout circuit or a slave column readout circuit. Secondary reference voltage generator 70' is sometimes referred to as a slave reference voltage generator.

The example of FIG. 5 in which column readout circuits 66 and 66' receive calibration voltage Vcal via reference column line 60 within region 52 is merely illustrative. In other embodiments, column readout circuits 66 and 66' can receive one or more calibration voltages Vcal via column lines lying within keep out region 50.

Secondary reference voltage generator 70' may be coupled to a control loop that includes circuits 72, 74, and 76. Error detection circuit 72 may have a first input configured to receive signal DNcal from first calibration readout circuit 66, a second input configured to receive signal DNcal' from second calibration readout circuit 66', and an output on which a corresponding error signal is generated. Error detection circuit 72 may compute the error signal by calculating a difference between signals DNcal and DNcal'. The error signal may be fed through loop filter 74. Loop filter 74 can be a digital loop filter circuit such as a low pass filter circuit configured to attenuate or filter out high frequency responses in the error signal.

The filtered error signal output from loop filter 74 may be fed to reference voltage controller 76. Reference voltage controller 76 may output a control signal for adjusting secondary reference voltage generator 70' depending on the filtered error signal. For example, controller 76 may output a control signal that directs generator 70' to increase Vref' by a corresponding amount in response to receiving a filtered error signal having a first polarity or that directs generator 70' to decrease Vref' by a corresponding amount in response to receiving a filtered error signal having a second polarity opposite the first polarity. The amount of increase or decrease in Vref' may depend on the magnitude of the filtered error signal. Circuits 66', 72, 74, 76, and 70' coupled together in this way is sometimes referred to as being part of a "closed" control loop or a digital feedback loop such as control loop 78. Since controller 76 is adjusting reference voltage generator 70' based on signals received from calibration readout circuits 66 and 66', circuits 66 and 70 are sometimes referred to collectively as master calibration circuits, whereas circuits 66' and 70' are sometimes referred to collectively as slave calibration circuits.

Arranged in this way, control loop 78 can dynamically adjust Vref' in real time to minimize the error signal so that calibration output signal DNcal' is equal to calibration output signal DNcal. The feedback loop 78 can operate continuously or in response to an observed change in the environment or operating conditions such as a change in temperature or an operating voltage, with the secondary reference voltage Vref' being stored by a latching circuit. By using error detector 72 to monitor only the outputs of the calibration ADCs 66 and 66' rather than the references voltage Vref and Vref' themselves, the ADC response and any local supply variations will be taken into account by calibration circuitry 200. When signals DNcal and DNcal' are matched, reference voltages Vref and Vref' can be equal or can be different.

Reference voltage Vref output from primary reference voltage generator 70 can be fed to all of the active column readout circuits 42-1, amplifiers, and/or other column readout circuits formed along the bottom peripheral edge of pixel array 32, whereas reference voltage Vref' output from secondary reference voltage generator 70' can be fed to all the active column readout circuits 42-2, amplifiers, and/or other column readout circuits formed along the top peripheral edge of pixel array 32. This is also shown in FIG. 3 where column readout circuits 42-1 are configured to receive primary reference voltage Vref, whereas column readout circuits 42-2 are configured to receive secondary reference voltage Vref'. Operated as such, the digital feedback loop can help reduce image artifacts caused by imbalance between two or more readout paths as a result of reference voltage mismatch and can also help dynamically correct for temperature and/or power supply variations. In general, this technique can be applied to mitigate imbalances between two or more remotely located, adjacent, or non-adjacent readout paths in an imaging device. In embodiments that include more than two readout paths, the master calibration circuits associated with one of the readout paths can be coupled to multiple slave calibration circuits associated with two or more other readout paths.

Figure 6:
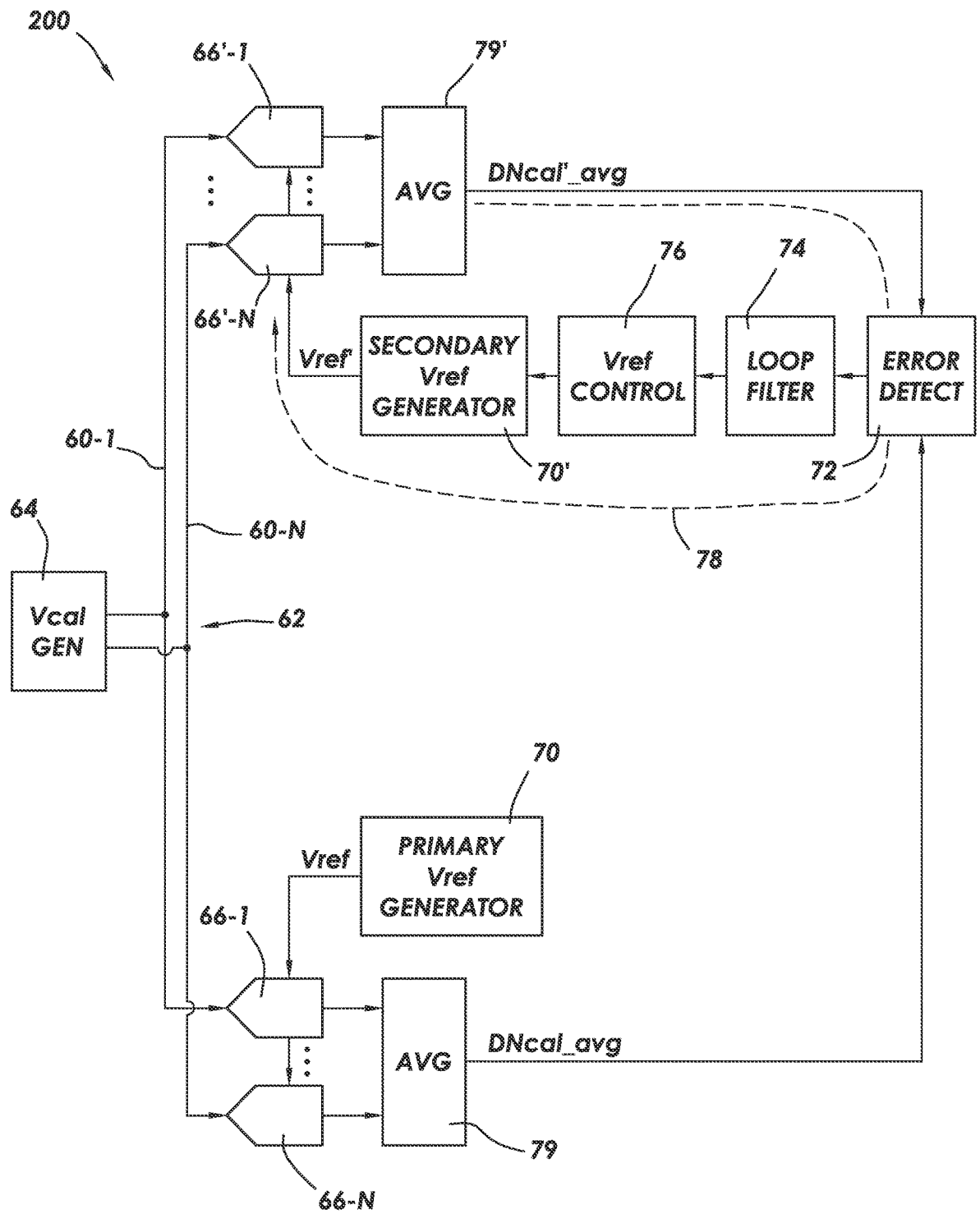
FIG. 6 is a block diagram of illustrative readout paths calibration circuitry that averages digital signals from multiple calibration column paths in accordance with some embodiments.

The embodiment of FIG. 5 in which calibration voltage Vcal is fed to one column readout circuit 66 and one column readout circuit 66' is merely illustrative and not intended to limit the scope of the present embodiments. In other embodiments, calibration voltage Vcal can be fed to two or more column readout circuits 66 or two or more column readout circuits 66' via different column lines formed in keep out zone 50 or reference path region 52. FIG. 6 shows another embodiment of readout paths calibration circuitry 200 having calibration voltage generator 64 that is configured to generate one or more calibration voltage(s) Vcal being fed to multiple column readout circuits 66 near the bottom of the pixel array and to multiple column readout circuits 66' near the top of the pixel array. As an example, reference voltage generator 64 can generate the same calibration voltage Vcal that is fed to all of the calibration readout circuits 66 and 66'. As another example, two or more calibration voltages can be injected into the various readout paths in a time interleaved manner. As another example, reference voltage generator 64 can generate different calibration voltages Vcal that are fed to the separate calibration readout circuits 66 and 66'. Calibration readout circuits 66 and 66' coupled to the same column line 60 should receive the same calibration voltage.

As shown in FIG. 6, the one or more calibration voltage(s) Vcal can be fed to multiple column readout circuits 66 such as calibration readout circuits 66-1 to 66-N via N column lines 60-1 to 60-N and can be fed to multiple column readout circuits 66' such as calibration readout circuits 66'-1 to 66'-N via the N column lines 60-1 to 60-N. In general, N may be equal to two, three, four, five, 5-10, more than 10, or any suitable positive integer. Calibration voltage generator 64 may be disposed at a center (middle) point 62 along the N column lines 60. The calibration voltage(s) Vcal will then propagate down to the N column readout circuits 66 along the lower half segments of column lines 60 and up to N column readout circuits 66' along the upper half segments of column lines 60. Since Vcal is injected at the center point 62 of column lines 60, any losses due to track impedance (for example) are balanced for the two readout paths.

The N column readout circuits 66 can receive a reference voltage Vref from primary reference voltage generator 70 and can generate corresponding first calibration outputs that are averaged using a first averaging circuit 79 to generate output DNcal_avg. Calibration output DNcal_avg may be a first averaged digital number that is a function of the Vcal and Vref voltages received at column readout circuits 66.

Similarly, the N column readout circuits 66' can receive a reference voltage Vref' from secondary reference voltage generator 70' and can generate corresponding second calibration outputs that are averaged using a second averaging circuit 79' to generate output DNcal'_avg. Calibration output DNcal'_avg may be a second averaged digital number that is a function of the Vcal and Vref' voltages received at column readout circuits 66'.

The example of FIG. 6 in which column readout circuits 66 and 66' receive calibration voltage Vcal via reference column lines 60 within region 52 is merely illustrative. In other embodiments, column readout circuits 66 and 66' can receive one or more calibration voltages Vcal via column lines lying within keep out region 50.

Similar to FIG. 5, secondary reference voltage generator 70' may be coupled to a digital control (feedback) loop 78 that includes circuits 72, 74, and 76. The structure and operation of the digital feedback loop is similar to that already described in connection with FIG. 5 and need not be reiterated in detail to avoid obscuring the present embodiments. Arranged in this way, control loop 78 can dynamically adjust Vref' in real time to minimize the error signal so that calibration output signal DNcal'_avg is equal to calibration output signal DNcal_avg. The feedback loop 78 can operate continuously or in response to an observed change in the environment or operating conditions such as a change in temperature or an operating voltage, with the secondary reference voltage Vref' being stored by a latching circuit. By using error detector 72 to monitor only the outputs of the calibration ADCs 66 and 66' rather than the references voltage Vref and Vref' themselves, the ADC response and any local supply variations will be taken into account by calibration circuitry 200.

Reference voltage Vref output from primary reference voltage generator 70 can be fed to all of the active column readout circuits 42-1, amplifiers, and/or other column readout circuits formed along the bottom peripheral edge of pixel array 32, whereas reference voltage Vref' output from secondary reference voltage generator 70' can be fed to all the active column readout circuits 42-2, amplifiers, and/or other column readout circuits formed along the top peripheral edge of pixel array 32. This is also shown in FIG. 3 where column readout circuits 42-1 are configured to receive primary reference voltage Vref, whereas column readout circuits 42-2 are configured to receive secondary reference voltage Vref'. Operated as such, digital feedback loop 78 can help reduce image artifacts caused by imbalance between two or more readout paths as a result of reference voltage mismatch and can also help dynamically correct for temperature and/or power supply variations. In general, this technique can be applied to mitigate imbalances between two or more remotely located, adjacent, or non-adjacent readout paths in an imaging device.

Figure 7:
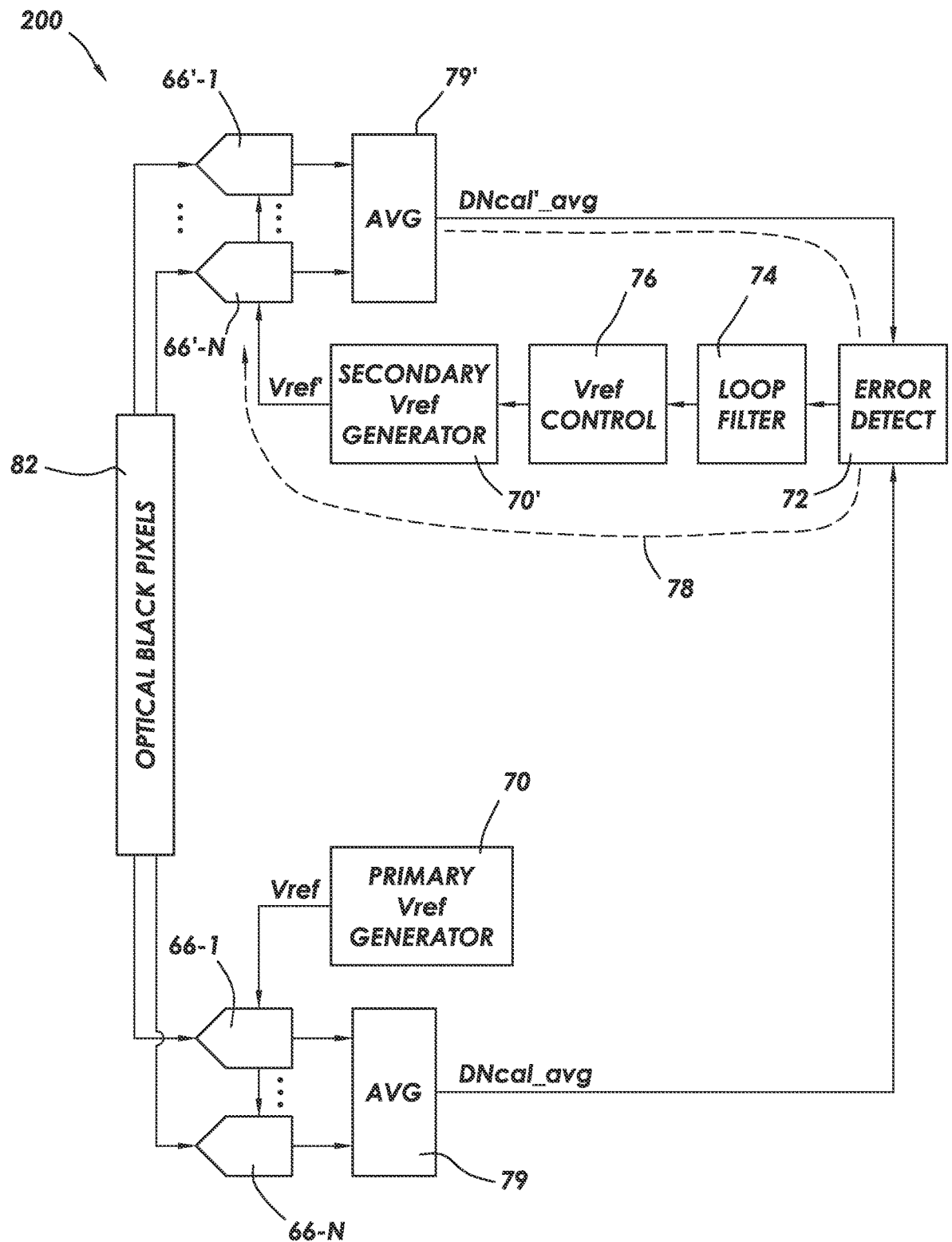
FIG. 7 is a block diagram of illustrative readout paths calibration circuitry that uses black pixels to generate a calibration voltage in accordance with some embodiments.

The embodiments of FIGS. 5 and 6 in which a calibration voltage generator 64 is used to generate one or more calibration voltage(s) Vcal for the calibration column readout circuits 66 and 66' are exemplary and are not intended to limit the scope of the present embodiments. FIG. 7 illustrates another embodiment in which pixels such as black pixels 82 are used to generate one or more calibration voltage(s) for calibration circuitry 200. Black pixels 82 can represent pixels formed in region 52 underneath light shielding layer 54 and are sometimes referred to as optical black pixels, dark pixels, or dummy pixels. Black pixels 82 can alternatively represent pixels formed in keep out region 50. Black pixels 82 formed in region 52 can be coupled to the various column readout circuits 66 and 66' via one or more reference column lines 60 traversing region 52. Alternatively black pixels 82 formed in region 50 can be coupled to the various column readout circuits 66 and 66' via one or more column lines traversing region 50. If desired, temporal averaging of the signals read out from black pixels 82 can be applied to help mitigate noise degradation. The remaining structure and operation of readout paths calibration circuitry 200 of FIG. 7 are substantially identical to that already described in connection with FIG. 6 and need not be reiterated in detail to avoid obscuring the present embodiments.

Figure 8:
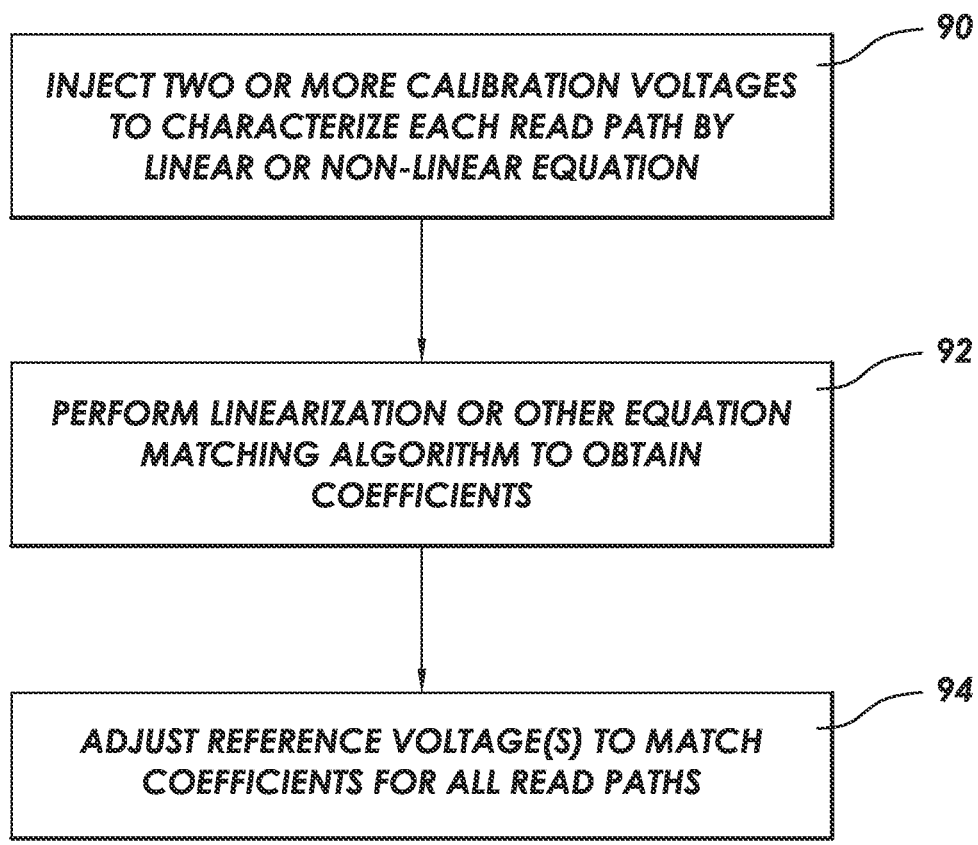
FIG. 8 is a flow chart of illustrative steps for characterizing each of the readout paths in accordance with some embodiments.

As described above in connection with the embodiments of FIGS. 5-7, readout paths calibration circuitry 200 can be configured to generate one or more calibration voltages for calibrating multiple remotely located readout paths. FIG. 8 is a flow chart showing illustrative operations for using two or more calibration voltages to characterize each readout path. In the operations of block 90, calibration voltage generator 64 can be used to generate two or more calibration voltages to characterize each readout path. For example, consider a scenario in which calibration circuitry 200 is being used to calibrate an imaging device with two remotely located readout paths such as a first readout path for reading signals down to column readout circuits 42-1 (as shown in the example of FIG. 3) and a second readout path for reading signals up to column readout circuits 42-2. For each of these readout paths, a first digital number can be generated when the calibration voltage is at a first voltage level, and a second digital number can be generated when the calibration voltage is at a second voltage level different than the first voltage level. If desired, the calibration voltage generator 64 can output additional calibration voltage levels to obtain additional digital numbers.

In the operations of block 92, the digital numbers obtained for each readout path can be fit to a linear equation using a linearization algorithm or can be fit to a non-linear question using other equation matching algorithms. As an example, the digital numbers obtained for the first readout path may be characterized using a linear equation having the expression "$y_1=m_1*x+c_1$", where the slope $m_1$ and the y-intercept $c_1$ depend on the associated reference voltage and the local power supply and temperature conditions of the first readout path. Similarly, the digital numbers obtained for the second readout path may be characterized using another linear equation having the expression "$y_2=m_2*x+c_2$", where the slope $m_2$ and the y-intercept $c_2$ depend on the associated reference voltage and the local power supply and temperature conditions of the second readout path. In general, other linear or non-linear equations can be used characterize each readout path.

In the operations of block 94, the reference voltage of each readout path can be adjusted to match the coefficients across all of the readout paths. For example, the reference voltage Vref' output from secondary reference voltage generator 70' can be dynamically adjusted in real time until slope coefficient $m_1$ is equal to $m_2$ and/or until y-intercept value $y_1$ is equal to $y_2$. Matching linear or non-linear equation coefficients in this way can help reduce image artifacts caused by imbalance between two or more readout paths as a result of reference voltage mismatch and can also help dynamically correct for temperature and/or power supply variations$_{[NC1]\ [JT2]}$. In some embodiments, the operations of block 94 can be skipped or omitted, and the coefficients generated from block 92 can be used to apply a digital correction to signals read out from the active readout circuits 42.

In general, this technique can be applied to mitigate imbalances between two or more remotely located, adjacent, or non-adjacent readout paths in an imaging device. In other embodiments, the calibration voltage generator 64 can output three or more different calibration voltage levels or four or more different calibration voltage levels to perform multi-point calibration to help increase the accuracy of the linear or non-linear equation characterizing each readout path.

The embodiments described in connection with FIGS. 5-8 in which an error signal output from error detection circuit 72 is used to tune secondary (slave) reference voltage Vref' is exemplary. In another embodiment, the error signal output from error detection circuit 72 can be used to correct errors later in the signal path by applying a gain offset between the various readout paths. In another embodiments, the error signal output from error detection circuit 72 can be fed as a digital number to digital processing circuits 44-1 and/or 44-2 (see FIG. 3) to help facilitate a predictive digital correction operation. Unlike the embodiments of FIGS. 5-8 that employ a closed loop feedback control, feeding the error signal downstream to the digital processing circuits in this way employs an "open" loop corrective action.

Figure 9:
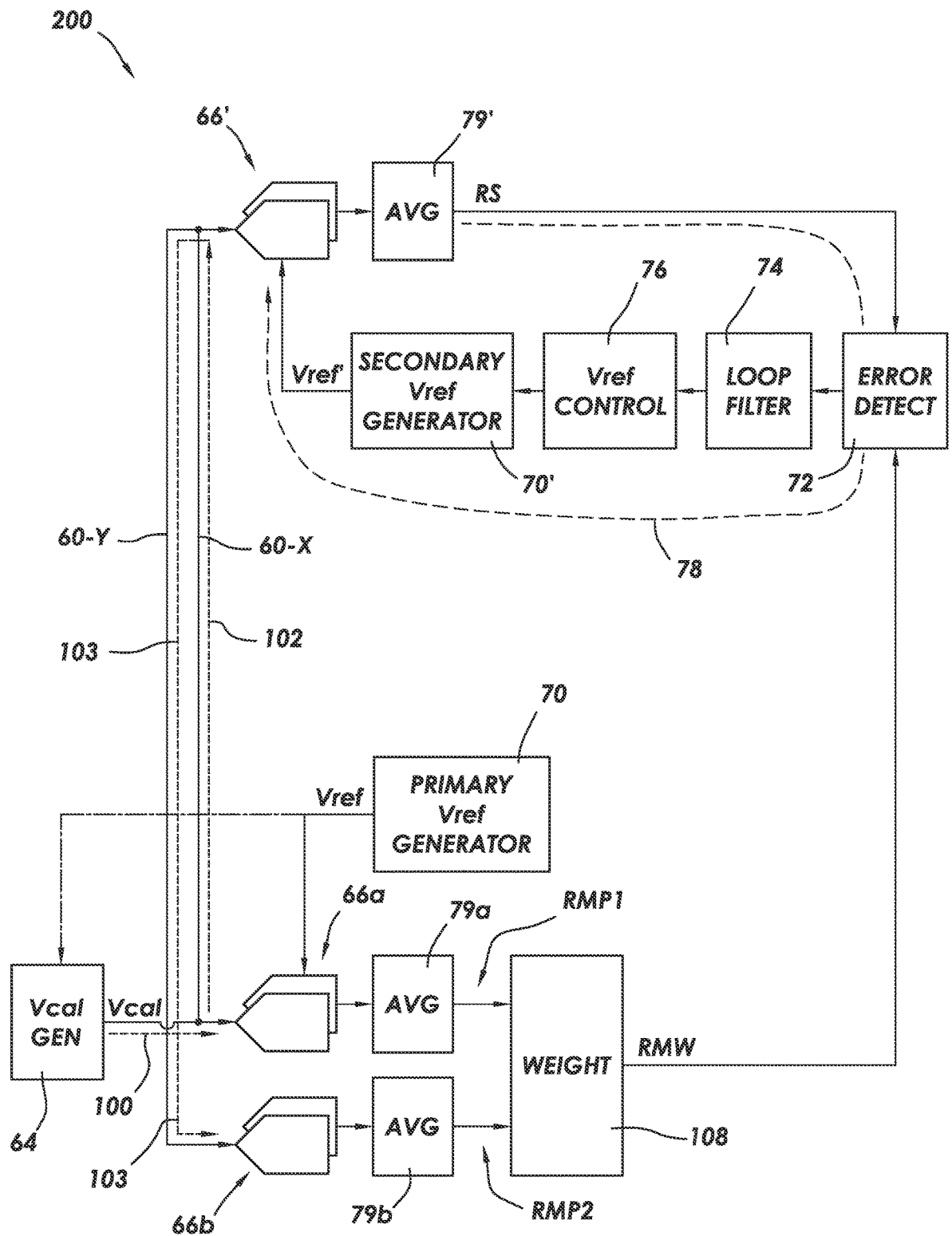
FIG. 9 is a block diagram of illustrative readout paths calibration circuitry that uses a calibration voltage generator disposed at the primary calibration readout location in accordance with some embodiments.

The examples of FIGS. 5 and 6 in which calibration voltage generator 64 is positioned at the middle or center point of the column readout line(s) are illustrative and not intended to limit scope of the present embodiments. FIG. 9 shows readout paths calibration circuitry 200 having calibration voltage generator 64 formed by or right next to the primary (master) calibration circuits. Calibration voltage generator 64 may optionally receive Vref from primary reference voltage generator 70.

As shown in FIG. 9, calibration voltage generator 64 can output a calibration voltage Vcal that is fed to a group of one or more column readout circuits 66a via path 100. The group of column readout circuits 66a can include two or more readout circuits, three or more column readout circuits, 2-10 readout circuits, or more than ten readout circuits formed at the lower edge of the pixel array. Column readout circuits 66a may be dedicated calibration readout circuits or part of active column readout circuits 42-1 formed along the bottom edge of the pixel array (see FIG. 3). Column readout circuits 66a can receive primary reference voltage Vref from generator 70. Based on the received Vcal conveyed over path 100 and the received Vref, the group of column readout circuits 66a can generate corresponding first calibration outputs that are averaged using a first averaging circuit 79a to obtain a first read master path output RMP1.

Calibration voltage Vcal can also be fed to a group of column readout circuits 66' via column line(s) 60-X, as indicated by signal path 102. Each column line 60-X may have a length that extends or spans all of the pixel rows or the height of the pixel array. Column lines 60-X can represent one or more column lines traversing region 50 or 52. The group of column readout circuits 66' can include two or more readout circuits, three or more column readout circuits, 2-10 readout circuits, or more than ten readout circuits formed at the upper edge of the pixel array. Column readout circuits 66' may be dedicated calibration readout circuits or part of active column readout circuits 42-2 formed along the top edge of the pixel array (see FIG. 3). Column readout circuits 66' can receive secondary reference voltage Vref' from generator 70'. Based on the received Vcal conveyed over path 102 and the received Vref', the group of one or more column readout circuits 66' can generate corresponding second calibration outputs that are averaged using a second averaging circuit 79' to obtain a read slave path output RS.

Calibration voltage Vcal arriving at circuits 66' can then be fed back down to another group of one or more column readout circuits 66b via column line(s) 60-Y, as indicated by loopback path 103. Column lines 60-Y can represent one or more column lines traversing region 50 or 52. Each column line 60-Y may have a length that extends or spans all of the pixel rows or the height of the pixel array. The group of column readout circuits 66b can include two or more readout circuits, three or more column readout circuits, 2-10 readout circuits, or more than ten readout circuits formed at the lower edge of the pixel array next to readout circuits 66a. Column readout circuits 66b may be dedicated calibration readout circuits or part of active column readout circuits 42-1 formed along the top edge of the pixel array (see FIG. 3). Column readout circuits 66b can also receive primary reference voltage Vref from generator 70. Based on the received Vcal conveyed over signal path 103 and the received Vref, the group of column readout circuits 66b can generate corresponding third calibration outputs that are averaged using a third averaging circuit 79b to obtain a second read master path output RMP2. By passing the Vcal signal up and down column lines 60-X and 60-Y, the IR (voltage) drop of the column lines can be taken into account by calibration circuitry 200.

Calibration circuitry 200 may include a weighting circuit 108 configured to receive the first read master path output RMP1 and the second read master path output RMP2. Outputs RMP1 and RMP2 may be digital numbers. Weighting circuit 108 can be configured to generate a corresponding read master weighted output RMW based on RMP1 and RMP2. As an example, weighting circuit 108 can provide an equal weighting of RMP1 and RMP2 by simply averaging RMP1 and RMP2 to generate RMW. As another example, weighting circuit 108 can provide an unequal weighting of RMP1 and RMP2 by increasing the weighting of RMP1 relative to RMP2 when generating RMW. As another example, weighting circuit 108 can provide an unequal weighting of RMP1 and RMP2 by decreasing the weighting of RMP1 relative to RMP2 when generating RMW. In general, any type of equal or unequal weighting scheme can be employed by circuit 108.

Similar to FIGS. 5 and 6, secondary reference voltage generator 70' may be coupled to a digital control (feedback) loop 78 that includes circuits 72, 74, and 76. Error detection circuit may have a first input configured to receive signal RMW from weighting circuit 108, a second input configured to receive signal RS from averaging circuit 79', and an output on which a corresponding error signal is generated. Error detection circuit 72 may compute the error signal by calculating a difference between signals RMW and RS. The remaining structure and operation of the digital feedback loop is similar to that already described in connection with FIG. 5 and need not be reiterated in detail to avoid obscuring the present embodiments.

Arranged in this way, control loop 78 can dynamically adjust Vref' in real time to minimize the error signal so that calibration output signal RS is equal to calibration output signal RMW. The feedback loop 78 can operate continuously or in response to an observed change in the environment or operating conditions such as a change in temperature or an operating voltage, with the secondary reference voltage Vref' being stored by a latching circuit. By using error detector 72 to monitor only the outputs of the calibration ADCs 66a, 66b, and 66' rather than the references voltage Vref and Vref' themselves, the ADC response and any local supply variations will be taken into account by calibration circuitry 200.

Reference voltage Vref output from primary reference voltage generator 70 can be fed to all of the active column readout circuits 42-1, amplifiers, and/or other column readout circuits formed along the bottom peripheral edge of pixel array 32, whereas reference voltage Vref' output from secondary reference voltage generator 70' can be fed to all the active column readout circuits 42-2, amplifiers, and/or other column readout circuits formed along the top peripheral edge of pixel array 32. Operated as such, digital feedback loop 78 can help reduce image artifacts caused by imbalance between two or more readout paths as a result of reference voltage mismatch and can also help dynamically correct for temperature and/or power supply variations. In general, this technique can be applied to mitigate imbalances between two or more remotely located, adjacent, or non-adjacent readout paths in an imaging device.

The example of FIG. 9 in which calibration circuitry 200 includes two different sets of calibration readout circuits 66a and 66b is merely illustrative. In other embodiments, calibration circuitry 200 can include a single set of calibration readout circuits 66a, without 66b, that is first used to measure RMP1 and then used to measure RMP1 while RMP1 is held for weighted averaging. An additional buffer or storage circuit may be used to temporarily store RMP1.

Figure 10:
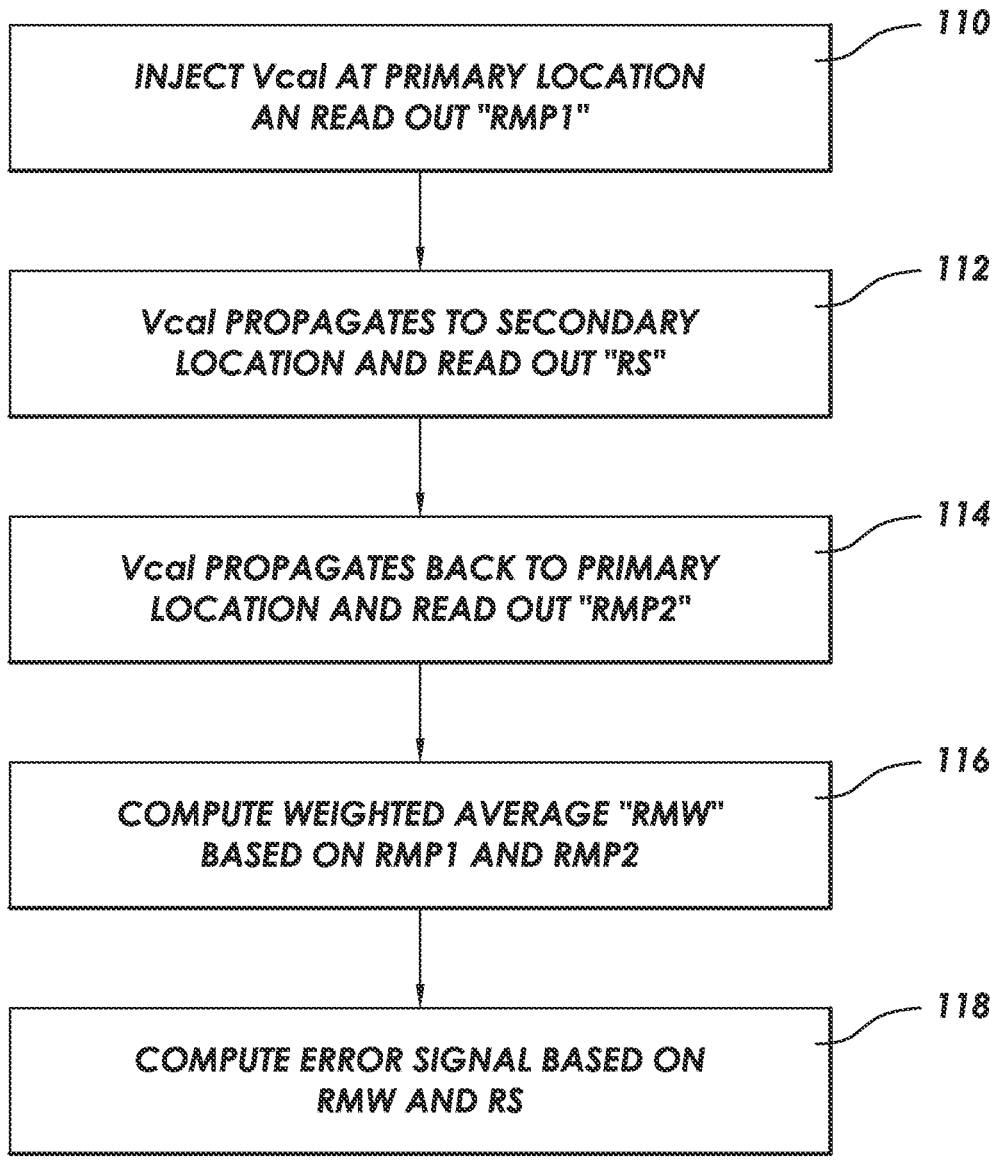
FIG. 10 is a flow chart of illustrative steps for operating readout paths calibration circuitry of the type shown in FIG. 9 in accordance with some embodiments.

FIG. 10 is a flow chart of illustrative steps for operating readout paths calibration circuitry 200 of the type shown in FIG. 9. In the operations of block 110, calibration voltage generator 64 may generate calibration voltage Vcal that is injected at a primary location, which can refer to a location near the bottom edge of the pixel array. Calibration voltage Vcal can be conveyed to one or more column readout circuits 66a via path 100, the outputs of which can optionally be averaged to obtain a readout value RMP1.

In the operations of block 112, the calibration voltage Vcal can propagate to a secondary location, which can refer to a location near the top edge of the pixel array or another other remote location that is physically separate from the primary location. Calibration voltage Vcal can be conveyed to one or more column readout circuits 66' via path 102, the outputs of which can optionally be averaged to obtain a readout value RS.

In the operations of block 114, the calibration voltage Vcal can propagate back down to the primary location. Calibration voltage Vcal can be conveyed to one or more column readout circuits 66b via loopback path 103, the outputs of which can optionally be averaged to obtain a readout value RMP2.

In the operations of block 116, weighting circuit 108 can be used to compute an average value RMW based on the received RMP1 and RMP2. As an example, weighting circuit 108 can provide an equal weighting of RMP1 and RMP2 by averaging RMP1 and RMP2 to generate RMW. As another example, weighting circuit 108 can provide an unequal weighting of RMP1 and RMP2 by weighting RMP1 more than RMP2 when generating RMW. As another example, weighting circuit 108 can provide an unequal weighting of RMP1 and RMP2 by weighting RMP1 less than RMP2 when generating RMW. For instance, a 60%/40% weighting scheme or a 70%/30% weighting scheme between RMP1 and RMP2 can be used. In general, any type of equal or unequal weighting scheme can be employed by circuit 108.

In the operations of block 118, error detector 72 can compute an error signal based on the received RMW and RS values. For example, error detector 72 can compute a difference of RMW and RS. An error signal computed in this way can be fed through the digital control loop 78 to fine tune secondary reference Vref' or can be used to correct errors later in the signal path by applying a gain offset between the various readout paths. In other embodiments, the error signal output from error detection circuit 72 can be fed as a digital number to digital processing circuits 44-1 and/or 44-2 (see FIG. 3) to help facilitate a predictive digital correction operation or other "open" loop corrective action.

The foregoing is merely illustrative and various modifications can be made to the described embodiments. The foregoing embodiments may be implemented individually or in any combination.

What is claimed is:

1. An image sensor comprising:
   a pixel array;
   first readout circuits disposed at a first location relative to the pixel array and configured to receive signals from the pixel array;
   second readout circuits disposed at a second location, different than the first location, relative to the pixel array and configured to receive signals from the pixel array;
   a first calibration readout circuit disposed by the first readout circuits and configured to receive a calibration voltage;
   a second calibration readout circuit disposed by the second readout circuits and configured to receive the calibration voltage; and
   an error detection circuit configured to output an error signal based on signals output from the first and second calibration readout circuits.

2. The image sensor of claim 1, wherein the first readout circuits are disposed along a first edge of the pixel array and wherein the second readout circuits are disposed along a second edge of the pixel array different than the first edge, further comprising:
   a calibration voltage generator configured to output the calibration voltage onto a column line that is coupled to the first and second calibration readout circuits.

3. The image sensor of claim 2, wherein the calibration voltage generator is disposed at a midpoint of the column line between the first and second calibration readout circuits.

4. The image sensor of claim 1, further comprising:
one or more black pixels configured to output the calibration voltage onto a column line that is coupled to the first and second calibration readout circuits.

5. The image sensor of claim 1, wherein the first calibration readout circuit comprises a first analog-to-digital converter and wherein the second calibration readout circuit comprises a second analog-to-digital converter.

6. The image sensor of claim 1, further comprising:
a first reference voltage generator configured to output a first reference voltage to the first calibration readout circuit and to the first readout circuits.

7. The image sensor of claim 6, further comprising:
a second reference voltage generator configured to output a second reference voltage to the second calibration readout circuit and to the second readout circuits.

8. The image sensor of claim 7, further comprising:
a loop filter coupled between the error detection circuit and the second reference voltage generator.

9. The image sensor of claim 8, further comprising:
a reference voltage controller coupled between the loop filter and the second reference voltage generator.

10. The image sensor of claim 1, further comprising:
at least one additional calibration readout circuit disposed by the first calibration readout circuit and configured to receive the calibration voltage; and
an averaging circuit configured to receive signals from the first calibration readout circuit and the at least one additional calibration readout circuit, wherein the averaging circuit is coupled between the first calibration readout circuit and the error detection circuit.

11. The image sensor of claim 1, further comprising:
at least one additional calibration readout circuit disposed by the second calibration readout circuit and configured to receive the calibration voltage; and
an averaging circuit configured to receive signals from the second calibration readout circuit and the at least one additional calibration readout circuit, wherein the averaging circuit is coupled between the second calibration readout circuit and the error detection circuit.

12. Imaging circuitry comprising:
a pixel array;
first readout circuits disposed along a first side of the pixel array;
second readout circuits disposed along a second side, different than the first side, of the pixel array;
a calibration voltage generator disposed by the first readout circuits and configured to generate a calibration voltage;
one or more first calibration readout circuits configured to receive the calibration voltage;
one or more second calibration readout circuits configured to receive the calibration voltage via a first column line; and
one or more third calibration readout circuits configured to receive the calibration voltage via the first column line and a second column line separate from the first column line.

13. The imaging circuitry of claim 12, further comprising:
an error detection circuit configured to output an error signal based on signals output from the one or more first calibration readout circuits, the one or more second calibration readout circuits, and the one or more third calibration readout circuits.

14. The imaging circuitry of claim 13, further comprising:
an averaging circuit coupled between the one or more second calibration readout circuits and the error detection circuit.

15. The imaging circuitry of claim 13, further comprising:
a first averaging circuit coupled between the one or more first calibration readout circuits and the error detection circuit; and
a second averaging circuit coupled between the one or more third calibration readout circuits and the error detection circuit.

16. The imaging circuitry of claim 15, further comprising:
a weighting circuit configured to receive a first average value from the first averaging circuit, to receive a second average value from the second averaging circuit, and to output a weighted value based on the first and second average values to the error detection circuit.

17. The imaging circuitry of claim 13, further comprising:
a first reference voltage generator configured to output a first reference voltage to the one or more first calibration readout circuits and to the first readout circuits.

18. The imaging circuitry of claim 17, further comprising:
a second reference voltage generator configured to output a second reference voltage to the one or more second calibration readout circuits and to the second readout circuits.

19. The image sensor of claim 18, further comprising:
a loop filter configured to filter the error signal; and
a reference voltage controller coupled between the loop filter and the second reference voltage generator.

20. A method of operating imaging circuitry comprising:
with a pixel array, capturing an image;
with first column readout circuits formed along a first peripheral edge of the pixel array, reading signals out from the pixel array via a first readout path;
with second column readout circuits formed along a second peripheral edge of the pixel array, reading signals out from the pixel array via a second readout path;
generating two or more calibration voltages to characterize the first readout path using a first equation having one or more first coefficients and to characterize the second readout path using a second equation having one or more second coefficients;
supplying a first reference voltage to the first column readout circuits;
supplying a second reference voltage to the second column readout circuits; and
adjusting the first and second reference voltages to match the one or more first coefficients with the one or more second coefficients.

* * * * *